No. 608,636. Patented Aug. 9, 1898.
C. H. BARTLETT.
LATHE CHUCK FOR WOODWORKING MACHINERY.
(Application filed Sept. 27, 1897.)
(No Model.)
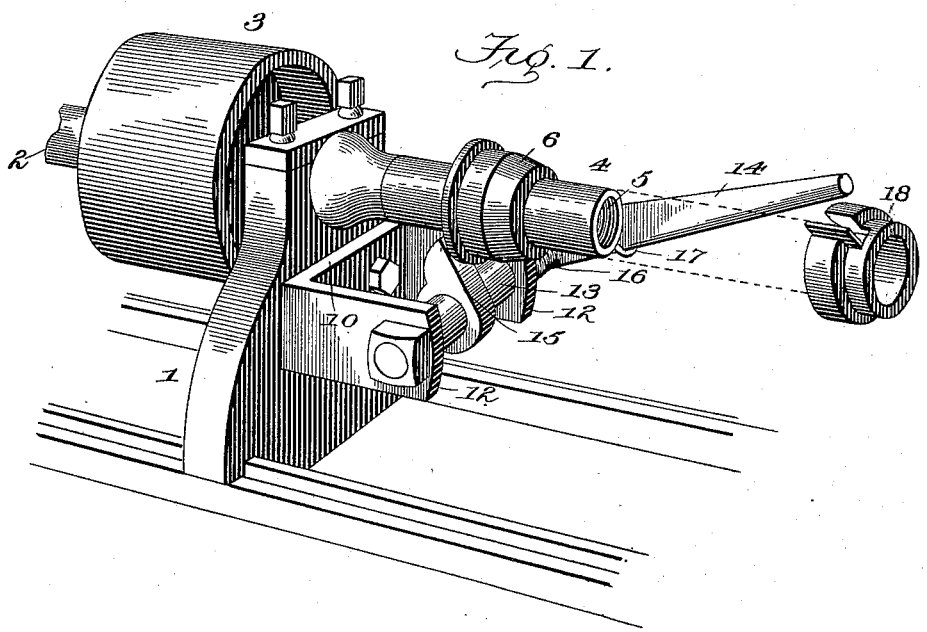
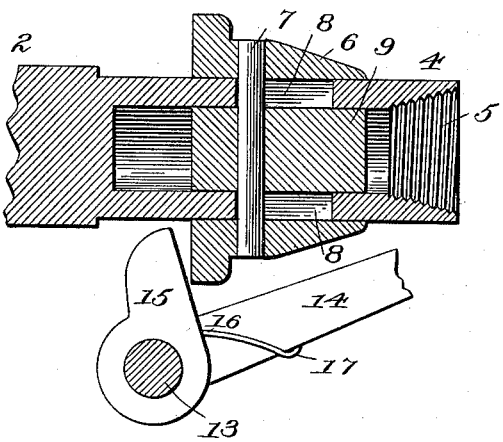
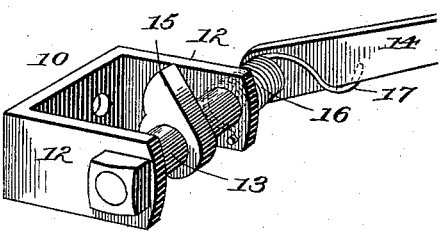
WITNESSES:
INVENTOR
Charles H. Bartlett
BY
Wm Jim
ATTORNEY.

UNITED STATES PATENT OFFICE.

CHARLES H. BARTLETT, OF NEW PORTLAND, MAINE.

LATHE-CHUCK FOR WOODWORKING MACHINERY.

SPECIFICATION forming part of Letters Patent No. 608,636, dated August 9, 1898.

Application filed September 27, 1897. Serial No. 653,113. (No model.)

*To all whom it may concern:*

Be it known that I, CHARLES H. BARTLETT, a citizen of the United States, residing at North New Portland, in the county of Somerset and State of Maine, have invented certain new and useful Improvements in Lathe-Chucks for Woodworking Machinery; and I do hereby declare the following to be a full, clear, and exact description of the invention, such as will enable others skilled in the art to which it appertains to make and use the the same.

My invention relates to improvements in lathe-chucks for woodworking machinery, and more particularly to that class of chucks used in connection with machinery for forming small articles, such as druggists' boxes, pipe-bowls, tool-handles, puff-boxes, and the like.

The object of the invention is to provide a lathe-chuck of peculiar shape, so as to allow the rounding or roughing tool to pass entirely over the same in order to cut nearer to the end of the wood, thereby saving a considerable portion of the timber or stock being worked. In the ordinary construction of chucks they are usually made with a large flaring or conical mouth and of greater diameter than the rougher, and as a consequence the said rougher cannot cut close to the end of the wood. This being the case a considerable amount of the stock being worked is lost or wasted, such wasted portion being that which projects from the mouth of the chuck and which cannot be acted upon owing to the roughing or rounding tool striking upon the outer edge or flange of the same.

It is the purpose of my invention to obviate this by constructing a chuck preferably of cylindrical form and of substantially uniform diameter throughout, so that the roughing or rounding tool can pass entirely over the same and be operated closer to the end of the wood than can be done with the ordinary chuck and rougher.

It is a further purpose of my invention to provide means for readily and quickly removing the short piece of wood remaining in the chuck when the work has been done.

Briefly stated, the invention consists of a hollow cylindrical chuck of substantially uniform or other suitable diameter throughout, and a plunger adapted to be moved or forced forward within the chuck and thereby remove the short section of wood remaining therein, and a lever arranged to operate said plunger.

In order to enable others skilled in the art to make use of my said invention, I will proceed to describe the same, reference being had for this purpose to the accompanying drawings, in which—

Figure 1 is a perspective view of a portion of a lathe with one of my improved chucks applied thereto. Fig. 2 is a longitudinal sectional view of a chuck constructed in accordance with my invention. Fig. 3 is a detailed perspective view of the rocking shaft and lever, and showing also its spring and supporting-bracket.

Referring now to the drawings, the reference-numeral 1 designates the bearing-block or head of an ordinary lathe, and 2 indicates a rotary shaft or mandrel having a bearing in said block or head and rotated in any suitable manner, as by a pulley 3. To the said shaft or mandrel I secure my improved chuck, which consists of a cylindrical sleeve 4, of practically uniform diameter throughout, and which is provided internally, at its forward end, with an inclined or conical bore, the wall of said bore being provided with gripping-threads 5, as is usual.

The reference-numeral 6 indicates a collar which loosely surrounds the cylindrical chuck 4, said collar carrying a pin 7, which passes vertically through the same and through elongated slots in the said chuck, whereby the collar rotates with the chuck and can be moved back and forth on the same. Within the hollow sleeve or chuck 4 I arrange a plunger 9, which is secured to the said pin 7, so as to be moved back and forth with it when the collar is moved. Thus it will be seen that if the collar 6 is driven forward the plunger 9 will be moved forward likewise, and if there should be a piece of the stock or timber being worked within the end or mouth of the chuck it will be instantly and easily removed.

In order that the plunger may be easily and readily operated, I have provided a simple and novel contrivance for this purpose, which will now be explained. To the block or head 1, directly beneath the chuck, I secure a bracket 10, having outwardly-extending arms 12, in the outer ends of which is journaled a rocking shaft 13, provided at one end with a suitable operating lever or handle 14, and between these bracket-arms said shaft is provided with a knocker-arm or projection 15, which lies immediately beneath the collar 6, so as to make contact with the rear end thereof and drive the same forward, and with it the plunger, whenever the handle or lever is operated. In practice it is desirable that the knocker-arm or projection 15 should normally be held away from and out of contact with the collar 6, and to accomplish this I secure one end of a spring 16 to one of the bracket-arms 12 and then coil the same around the shaft, bringing the other end forward and looping or securing it in any suitable manner, as at 17, to the handle or operating-lever 14. Hence it will be seen that the tension of the spring 16 normally acts to rock or rotate the shaft backward, and as a consequence holds the knocker-arm or projection out of contact with the collar 6.

The reference-numeral 18 designates the roughing or rounding tool, which, as will be seen by referring to the drawings, is made of such a diameter and shape as to admit of its entirely passing upon or over the chuck for the purpose heretofore specified.

The construction and operation of my chuck will be readily understood from the foregoing detailed description and without further explanation. The parts of my chuck are preferably made of metal; but they may be made of any other material suitable for the purpose.

I do not wish to be understood as limiting myself to the precise details of construction herein set forth, for obviously slight modifications may suggest themselves to the skilled mechanic, and for the purpose of this specification I deem it sufficient to describe what might be termed the "preferred" construction and arrangment of parts. In the specification I have referred to the chuck as being of uniform diameter throughout; but I do not wish to be understood as limiting myself to this precise form of chuck, for obviously it may be made of varying diameter.

What I claim, and desire to secure by Letters Patent, is—

1. In a lathe-chuck, the combination with a hollow cylindrical sleeve provided at its forward end with a conical opening the wall of which is threaded, of a collar loosely surrounding said sleeve, and adapted to be moved back and forth thereon, a plunger of less length than the bore of the sleeve, loosely arranged within the latter and adapted to be brought forward therein for the purpose specified, a pin connecting said collar and plunger and a knocker-arm adapted to make contact with the collar to drive the plunger forward, substantially as described.

2. In a lathe-chuck, the combination with a hollow cylindrical sleeve provided at its forward end with a conical opening the wall of which is threaded, of a collar loosely surrounding said sleeve and adapted to be moved back and forth thereon, a plunger of less length than the bore of the sleeve loosely arranged within the latter and adapted to be brought forward therein to remove stock from the same, a pin connecting said collar and plunger, a rocking shaft journaled in brackets adjacent to the chuck, a knocker-arm secured to said shaft and adapted to make contact with the collar to operate the plunger, and a hand-lever secured to one end of said shaft, substantially as described.

3. In a lathe-chuck, the combination with a hollow cylindrical sleeve provided with stock-gripping means at its forward end, of a collar loosely surrounding said sleeve and adapted to be moved thereon, a plunger loosely arranged within the sleeve and adapted to be brought forward thereon to remove stock from the same, a pin connecting said collar and plunger, a shaft journaled in brackets adjacent to the chuck, a knocker-arm secured to said shaft and adapted to make contact with the collar to operate the plunger, a lever for operating the shaft, and a spring acting upon the shaft to normally hold the knocker-arm out of contact with the collar.

4. In a lathe-chuck, the combination with a hollow cylindrical sleeve provided with a conical threaded bore at its forward end, of a collar loosely surrounding said sleeve, a plunger freely mounted within the sleeve and adapted to reciprocate therein for the purpose described, a connection between said collar and plunger, a bracket, 10, secured adjacent to the sleeve and provided with arms, 12, a shaft journaled in said arms, a knocker-arm, 15, secured to said shaft, and adapted to make contact with the collar, a hand-lever fixed to one end of the shaft, and a spring having its opposite ends secured to the lever and one of said arms respectively, said spring acting to normally hold the knocker-arm out of contact with the collar.

In testimony whereof I affix my signature in presence of two witnesses.

CHARLES H. BARTLETT.

Witnesses:
OSCAR M. PERKINS,
CELIA TAGUE.